United States Patent [19]

Yoshimoto et al.

[11] Patent Number: 5,162,287
[45] Date of Patent: Nov. 10, 1992

[54] PARTICULATE REMOVING CATALYST FILTER

[75] Inventors: Masafumi Yoshimoto, Sakai; Tadao Nakatsuji, Nara; Kazuhiko Nagano; Kimihiko Yoshida, both of Sakai, all of Japan

[73] Assignee: Sakai Chemical Industry Co., Ltd., Osaka, Japan

[21] Appl. No.: 684,122

[22] Filed: Apr. 12, 1991

Related U.S. Application Data

[63] Continuation-in-part of Ser. No. 419,239, Oct. 10, 1989, abandoned.

[30] Foreign Application Priority Data

Oct. 11, 1988 [JP] Japan ............................. 63-255087
Jul. 14, 1989 [JP] Japan ............................. 1-183062

[51] Int. Cl.$^5$ ........................ B01J 32/00; B01J 35/04
[52] U.S. Cl. ................................. 502/439; 502/527; 423/215.5
[58] Field of Search .................. 502/527, 439; 423/215.5

[56] References Cited

U.S. PATENT DOCUMENTS

| | | | |
|---|---|---|---|
| 4,597,262 | 7/1986 | Retallick | 502/527 X |
| 4,617,289 | 10/1986 | Saito et al. | 423/215.5 |
| 4,710,487 | 12/1987 | Koch | 423/215.5 |
| 4,849,399 | 7/1989 | Joy et al. | 502/325 X |

*Primary Examiner*—W. J. Shine
*Attorney, Agent, or Firm*—Nikaido, Marmelstein, Murray & Oram

[57] ABSTRACT

The present invention relates to a particulate removing catalyst filter in which an oxidizing catalyst is carried on the surface portions of an air-permeable substrate to a depth, based on the substrate and the catalyst, of up to 19% measured from the exposed surface of the catalyst through which the exhaust gas is adapted to be passed, and to a particulate removing catalyst filter in which a catalyst is carried on a thin wire net or metallic plate having a plurality of fine through-holes. The exhaust gas from a diesel engine is forcibly passed through the filter, thereby to remove particulates in the exhaust gas.

2 Claims, 4 Drawing Sheets

PARTICULATE REMOVING CATALYST FILTER

This is a continuation in part of Ser. No. 419,239 filed on Oct. 10, 1989, now abandoned.

BACKGROUND OF THE INVENTION

The present invention relates to a particulate removing catalyst filter and a particulate removing method. More particularly, the present invention relates to a particulate removing catalyst filter for removing particulates contained in the exhaust gas from a combustion engine, such as a diesel engine or the like, and to a particulate removing method using this catalyst filter.

The exhaust gas discharged from a diesel engine contains particulates. Such particulates contain not only soot (carbon), but also a variety of hydrocarbons from soft hydrocarbons to heavy hydrocarbons (polycyclic aromatic hydrocarbons), sulphuric acid mist ($SO_4$), and the like. There are some particulates having particle sizes as large as several thousand angstroms. However, it is generally considered that their particle sizes are in a range from about 100 to 1000 angstroms, with the average size being in a range from about 300 to about 500 angstroms.

Such particulates are produced due to incomplete combustion of diesel engine fuel or light oil. Recently, it has been strongly desired to prevent such particulates, as well as nitrogen oxide, from spreading in the atmosphere with a view toward prevention of air pollution.

In this connection, there have been proposed a variety of particulate removing catalyst devices arranged such that a filter carrying an oxidizing catalyst is disposed in the exhaust system of a diesel engine so that catalytic oxidation of the particulates occurs, causing the particulates to be finally decomposed and removed (see for example, Japanese Publication of Unexamined Patent Application No. 185425/1988).

As a typical example of the catalyst filter of the type above-mentioned, there is known a catalyst filter formed in a honeycomb structure, in which the honeycomb structure substrate, made of ceramic or the like, carries a catalyst component, or in which the honeycomb structure itself is made of a catalyst component.

However, the exhaust gas discharged from a diesel engine contains not only the particulates above-mentioned, but also gaseous components such as nitrogen oxide, gaseous hydrocarbons, CO, sulfur dioxide ($SO_2$) and the like. Accordingly, when the particulates are oxidized and dissolved in or on the partition wall of the honeycomb structure, the sulfur dioxide in the gaseous components is also oxidized and converted into sulfates by the same catalyst. Such sulfates may bring about acid rain or generate secondary particulates. With a view toward prevention of air pollution, it has been strongly desired to minimize the production of such sulfates.

On the other hand, while the engine is rotating at a low speed or with no load applied thereto, the exhaust gas temperature is lower (about 300° C.) than that at loaded normal operation. This prevents the particulates from being sufficiently oxidized and dissolved by the catalyst filter. Accordingly, the particulates are accumulated in the partition walls and thereby prevent the exhaust gas from passing therethrough. This disadvantageously increases the pressure drop of the exhaust gas across the partition walls. If the pressure drop of the exhaust gas across the catalyst filter is increased, the fuel combustion condition in the diesel engine combustion chamber is deteriorated by the back pressure from the catalyst filter. This further accelerates the generation of the particulates, thereby to further increase the accumulation of the particulates on the partition walls. This cycle is exascerbated by the further increase in pressure drop. This involves the likelihood that the fuel combustion will be incomplete in the engine.

To solve such a problem, the catalyst filter may be externally heated so that the oxidation and decomposition of the particulates proceeds sufficiently even though the diesel engine is rotating at a low speed or with no load applied thereto. However, such arrangement requires an external heater and a heat sources therefor. This makes such arrangement unpractical in view of the cost.

SUMMARY OF THE INVENTION

It is an object of the present invention to provide a particulate removing catalyst filter capable of accelerating the decomposition of the particulates while restraining the generation of sulfates.

It is another object of the present invention to provide a particulate removing catalyst filter which assures high chances of the catalyst coming into contact with the particulates and in which there is no possibility of nonreacted particulates remaining, thereby to oxidize and remove the particulates in a stable manner for a long period of time without increase in pressure drop with concomitant increase in fuel cost, and also to provide a particulate removing method using the above-mentioned filter.

The present invention provides a particulate removing catalyst filter in which an oxidizing catalyst is carried on the surface portions of an air-permeable substrate through which the exhaust gas is to pass. The term "in which an oxidizing catalyst is carried on the surface portions of a substrate" includes not only a mode in which the oxidizing catalyst is carried on only the surface portions of the substrate, but also a mode in which a major portion of the oxidizing catalyst is carried on at least the surface portions of the substrate.

According to the study of the Inventors, the particulate decomposition reaction velocity is faster than the oxidation speed of sulfur dioxide. Accordingly, in the particulate removing catalyst filter of the present invention, in which the oxidizing catalyst is carried substantially only on the surface portions of an air-permeable substrate through which the exhaust gas is to pass, the particulates may be quickly oxidized and decomposed by the oxidizing catalyst on the surface portions, but the oxidation of sulfur dioxide does not substantially proceed, to an extent sufficient to convert substantially portions of the sulfur dioxide into sulfates. This may restrain the generation of sulfate without preventing the removal of the particulates.

To enhance the particulate removing efficiency of such catalyst filter, there may be suitably applied, to the catalyst filter above-mentioned, the particulate removing method of the present invention by which the exhaust gas from a diesel engine is forcibly passed through said filter.

According to another embodiment of the present invention, there is proposed a particulate removing catalyst filter in which a catalyst is carried on a wire net or metallic plate having a plurality of fine holes.

The wire net or metallic plate above-mentioned may be mainly made of stainless steel.

In the catalyst filter, the exhaust gas is forcibly passed through the fine holes, assuring high chances of the particulates coming in contact with the catalyst. Further, the catalyst carrier is a thin wire net or metallic plate. This involves no likelihood that unreacted particulates remain inside, as is the case in a normal honeycomb structure filter. Accordingly, even during the long-term operation of a diesel engine or the like, the pressure drop across the catalyst filter is not increased, enabling the particulates to be removed in a stable manner.

To enhance the particulate removing efficiency of such catalyst filter, there may be suitably applied to the catalyst filter above-mentioned, the particulate removing method the present invention by which exhaust gas from a diesel engine is forcibly passed therethrough.

DETAILED DESCRIPTION OF THE INVENTION

Figure 1:
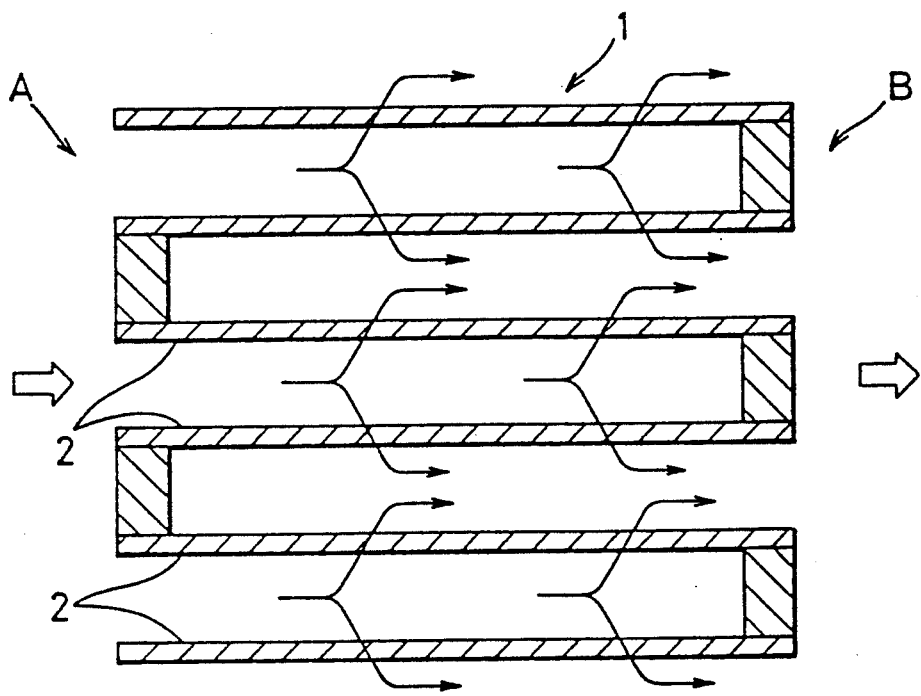
FIG. 1 is a section view of a catalyst filter in the form of a honeycomb structure in accordance with a preferred embodiment of the present invention.

No particular restrictions are imposed on the catalyst filter in which an oxidizing catalyst is carried on the surface portions of an air-permeable substrate through which the exhaust gas is to pass, as long as the exhaust gas can pass through the catalyst filter. For example, the catalyst filter may be used in the form of a honeycomb structure 1 as shown in FIG. 1. More specifically, the catalyst filter in FIG. 1 is formed such that the oxidizing catalyst is carried on the honeycomb structure 1 made of ceramic provided at the exhaust gas inlet side A with openings and at the exhaust gas outlet side B with openings, these openings being alternately closed. Partition walls 2 of the honeycomb structure 1 are made of porous ceramic. Accordingly, the exhaust gas (shown by arrows) introduced into the filter from the inlet side A is forcibly passed through the partition walls 2 and discharged through the outlet side B. The shapes of these openings are not particularly limited, but may be hexagonal, circular, rectangular, or triangular.

According to the present invention, the air-permeable substrate forms the partition walls 2 of the honeycomb structure 1, and may be suitably made of porous ceramic such as alumina, cordierite or the like, in view of the good particulate collecting efficiency and heat resistance of ceramics. Since the air-permeable substrate is porous, a number of permeable fine pores are formed therein. The exhaust gas is adapted to pass through these permeable holes. The thickness of the air-permeable substrate can be suitably varied but is generally in a range from about 0.1 to about 1 mm.

The thickness of the catalyst on the surface of each surface portion carrying the catalyst is preferably in a range of, for example, 5 to 100 $\mu m$, preferably 10 to 50 $\mu m$, for a substrate having a thickness of 300 $\mu m$. This is up to about 19%, or less, of the thickness of the plate carrying the catalyst.

In order that the oxidizing catalyst is carried on the surface portions of the air-permeable substrate, the oxidizing catalyst may be carried directly on the substrate, or a catalyst carrier is first applied to the substrate, after which the oxidizing catalyst is then carried on this catalyst carrier. Alternatively, a carrier on which a catalyst component is already carried, may be carried on the substrate. When a catalyst is to be carried directly on the substrate, the substrate surfaces may be previously treated such that the catalyst is suitable carried on only the surface portions of the substrate (for example, the substrate may be heated before the catalyst is disposed thereon).

According to a more specific method of carrying the catalyst, the substrate may be immersed in a solution in which a salt of the catalyst component has been dissolved, and then dried so that the catalyst component is applied to the surface portions of the substrate. Thereafter, the substrate may be calcined at a temperature of about 300 to 800° C. In order that the oxidizing catalyst is selectively carried on the surface portions of the substrate, the rate at which the temperature is increased at the time of drying may be adjusted. More specifically, when drying a substrate which has been uniformly impregnated with a solution in which a salt of the catalyst component has been dissolved, a higher rate of temperature increase causes the substrate to be dried with a larger portion of the solution moved toward the surface portions of the substrate. Thus, the catalyst may be made to be predominantly carried on the surface portions. However, if the rate of temperature increase is excessively fast, the substrate will be dried before the solution is moved to the surface. This fails to carry the oxidizing catalyst to substantially only the surface portions of the substrate. It is therefore required to set a suitable rate of increase of temperature during drying.

According to another method of applying the catalyst to the surface portions of the substrate, a slurry of a carrier component (alumina powder or the like) may be first deposited on the surface portions of the substrate, and the catalyst component may be then deposited thereon. Alternatively, a slurry may be formed of a catalyst component already disposed on a carrier component, which may then be deposited on the surface portions of the substrate.

According to the present invention, it is not always required that the oxidizing catalyst be disposed on both sides of the surface portions of the substrate but the catalyst may be disposed on either or both sides of the substrate.

Examples of the oxidizing catalyst to be used in the present 15 invention include a variety of conventional oxidizing catalysts including: a single metal such as platinum, palladium; manganese oxide, chromium oxide, copper chromate, iron oxide or the like.

Examples of the catalyst carrier to be used when the catalyst is carried on the substrate through a carrier, include alumina, titania, zirconia or the like.

Figure 2:
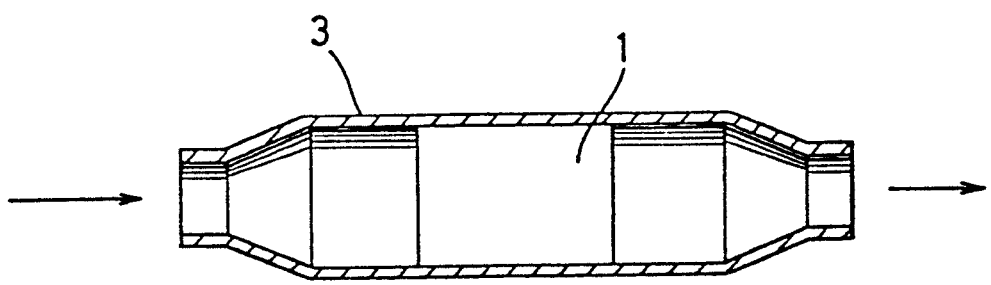
FIG. 2 is a section view of a catalyst device having the catalyst filter of the honeycomb structure in FIG. 1.

For example, as shown in FIG. 2, a catalyst filter comprising a honeycomb structure 1 is disposed in a cylindrical case 3, thus forming a particulate removing catalyst device to be incorporated in the exhaust system of a diesel engine or the like.

Figure 3:
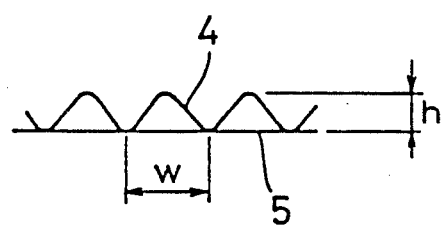
FIG. 3 is a plan view of flat and corrugated plates made of a ceramic fiber sheet.
Figure 4:
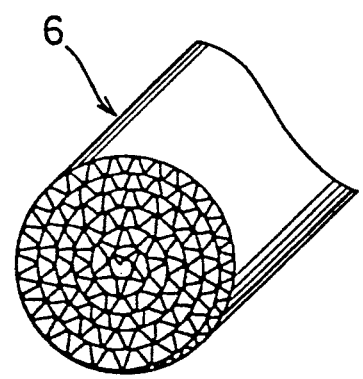
FIG. 4 is a perspective view of a honeycomb structure made of the corrugated and flat plates in FIG. 3.

According to the present invention, the catalyst filter may be used in the form of a honeycomb structure 6 shown in FIG. 4. This honeycomb structure 6 is formed by winding an assembly of a corrugated plate 4 overlapping on a flat plate 5 as shown in FIG. 3, both plates being made of a ceramic fiber sheet serving as the air-permeable substrate. The oxidizing catalyst is carried on the surfaces of the corrugated plate 4 and the flat plate 5.

The following description will discuss a catalyst filter in which the catalyst is carried on a thin wire net or metallic plate having a number of fine holes.

The wire net serving as the substrate is made with the use of a metallic wire member made of: a single metal such as iron, cobalt, molybdenum, titanium, zirconium, chromium, silver gold, copper, nickel, tin or the like; or an alloy such as iron alloy including stainless steel, a copper alloy, a nickel alloy, a tin alloy, a chromium alloy and the like.

The metallic plate may be formed by piercing a number of fine holes, by etching or the like, in a thin metallic plate made of a metallic material similar to the metal wire material above-mentioned. In view of machinability, heat resistance and the like, stainless steel, such as SUS 304 or the like, may be preferably used as the metallic material forming the wire net or metallic plate. When heat resistance is particularly required, there may be preferably used chrom-nickel steel, manganese-chrom steel, chrom-aluminum steel, nickel-chrom-cobalt steel or the like.

Each of the fine holes formed in the wire net or metallic plate (or alternatively each of the meshes in the wire net) should have a diameter of 30 $\mu$m or more, preferably in a range from 100 to 500 $\mu$m, in view of the maximum grain size of the particulates to be decomposed and the pressure drop which is acceptable.

The thickness of the wire net or metallic plate is preferably in a range of from 0.05 to 0.5 mm in view of the strength of the catalyst filter and the passage of the particulates therethrough.

The wire net or metallic plate having the arrangement above-mentioned is extremely thin and has fine holes having diameters which are large enough to not prevent the particulates from passing therethrough. This involves no likelihood that unreacted particulates remain in the catalyst.

For carrying the catalyst on the substrate, there are available four methods as outlined below.

According to a first method, a catalyst carrier component, such as alumina or the like, is spray-coated on the wire net or metallic plate, and the catalyst is then disposed on the catalyst carrier component.

When the wire net or metallic plate made of iron, such as stainless steel or the like, is used, there may be used a second, third or fourth method.

According to the second method, this iron wire net or metallic plate is heated so that the surface thereof is oxidized by the air to form an iron oxide layer on the surface. On this iron oxide layer, the catalyst is carried. According to the third method, the iron constituting the wire net or metallic plate is partially eluted, causing the wire net or metallic plate to be porous. A catalyst carrier such as alumina or the like is disposed on the porous wire net or metallic plate, and the catalyst is then carried thereon. According to the fourth method, a portion of the iron constituting the wire net or metallic plate is substituted with active platinum, palladium or the like, as a catalyst. The iron oxide above-mentioned may be used as the catalyst for oxidizing and decomposing the particulates. Accordingly, the method of merely heating the wire net or metallic plate made of iron such as stainless steel or the like so that the surface layer thereof is oxidized with the air, is included in the method of carrying the catalyst of iron oxide on the substrate.

As the catalyst to be carried on the substrate, there may be used any of the examples of the catalyst above-mentioned.

The catalyst filter may be shaped in a desired form or may be made into a desired arrangement by machining or combining the wire net or metallic thin plate carrying the catalyst thereon. With the use of such filter, the catalyst device may be shaped in different forms and arranged in different structures.

The following description will discuss embodiments of the catalyst device comprising the catalyst filter above-mentioned, with references to the drawings.

Figure 5:
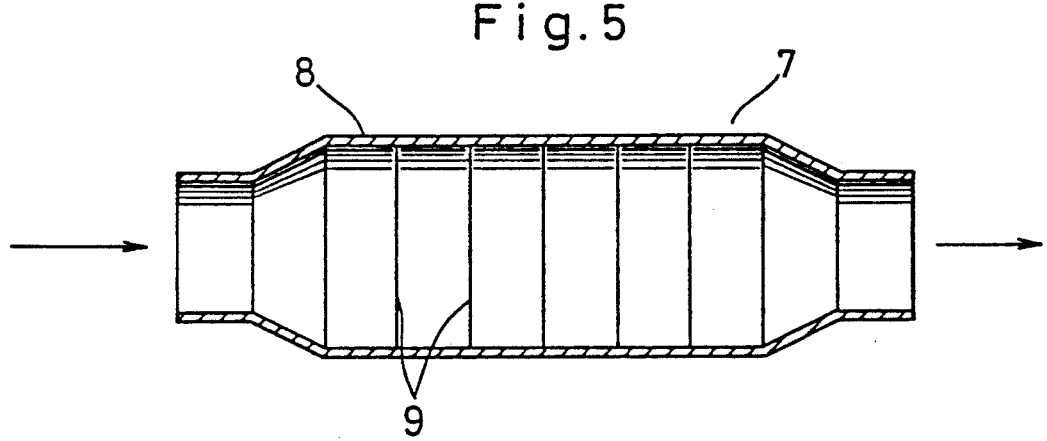
FIG. 5 is a section view of a catalyst device having a catalyst filter made of a wire net or metallic plate.

In FIG. 5, a catalyst device 7 includes a cylindrical casing 8 of which both ends are opened, and a plurality of catalyst filters 9 made of a wire net carrying a catalyst. The catalyst filters 9 are disposed in the casing 8 in parallel with one another at spaced intervals. When this catalyst device 7 is installed, the exhaust gas is forcible passed through the catalyst filters 9 as shown by arrows in FIG. 5, and the particulates in the exhaust gas are securely removed by a plurality of the catalyst filters 9.

Figure 6:
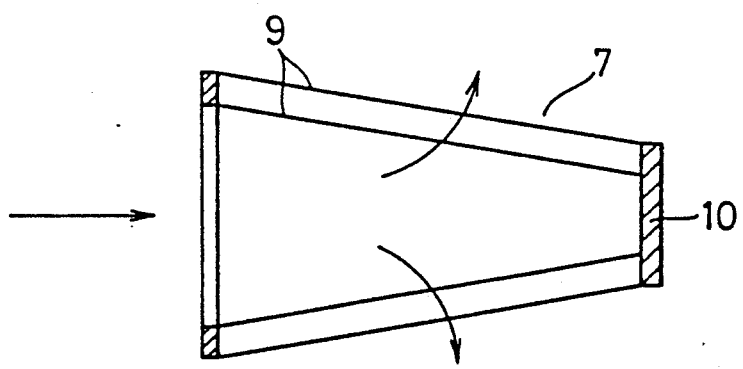
FIG. 6 is a section view of a catalyst device formed by overlapping, in the form of a coaxial cone, catalyst filters each of which is made of the wire net or metallic plate in FIG. 5.

FIG. 6 shows another embodiment of the catalyst device 7, in which a plurality of catalyst filters 9 are overlapped in the form of a coaxial cone. This catalyst device 7 is open at the exhaust gas inlet side thereof, and closed at the rear end thereof by a wall 10 which prevents the exhaust gas from passing therethrough. Thus, the exhaust is forcibly passed through the catalyst filters 9 to oxidize the particulates. A plurality of such catalyst devices may be disposed in series in the exhaust gas system as necessary. The arrangement in which a plurality of conical catalyst filters 9 are overlapped, presents the advantage that the contact area per catalyst capacity is increased without increase in pressure drop.

Figure 7:
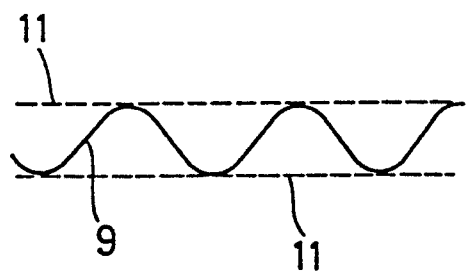
FIG. 7 is a section view of a catalyst filter made of the wire net or metallic plate in FIG. 5 which is secured, in a corrugated manner, between two large-mesh wire nets.
Figure 8:
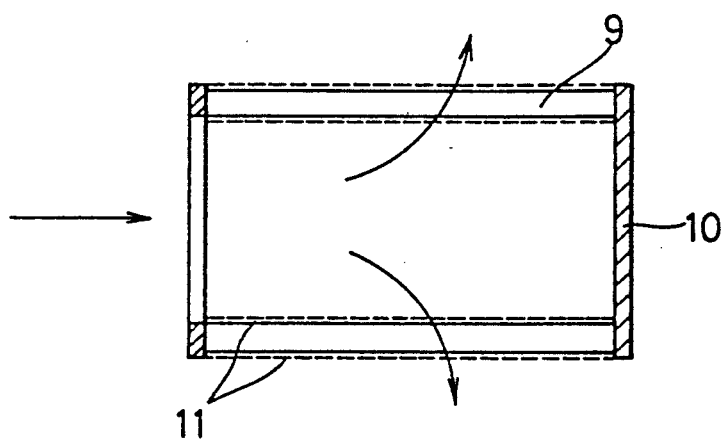
FIG. 8 is a section view of a catalyst device formed by machining the catalyst filter in FIG. 7 into a cylindrical shape.

As shown in FIG. 7, a catalyst filter 9 may be secured in a corrugated manner between two support members, for example large-mesh wire nets 11, permitting the exhaust gas to easily pass therethrough. This assembly is machined in the form of a cylinder wherein the downstream end of which is closed by a wall 10 which prevents the exhaust gas from passing therethrough, as shown in FIG. 8. This cylindrical assembly is mounted on a suitable casing (not shown), thus forming a catalyst device. In this catalyst device, the exhaust gas introduced therein is forcibly passed through the catalyst filter 9. A plurality of such catalyst devices may be coaxially disposed as necessary. The arrangement in which the catalyst filter 9 is configured in the form of a corrugation, presents the advantage that the contact area per catalyst capacity is further increased as compared with the arrangement shown in FIG. 6.

Figure 9:
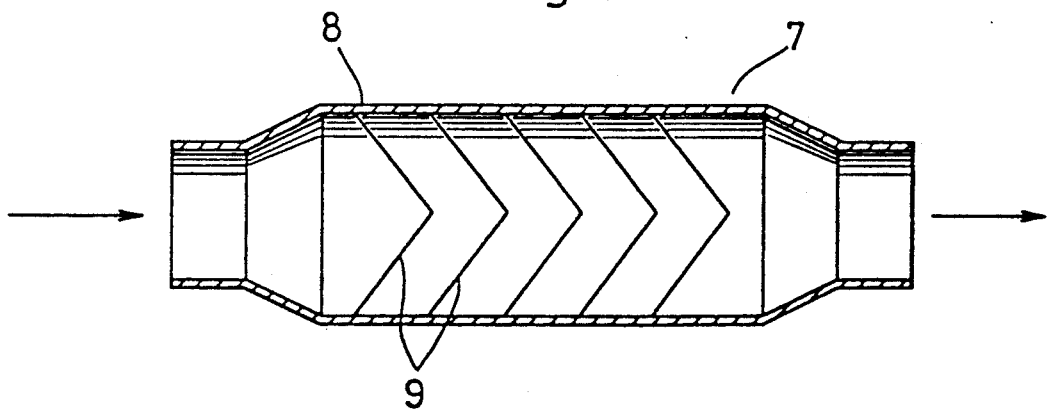
FIG. 9 is a section view of a catalyst device in which each of the catalyst filters made of the wire net or metallic plate above-mentioned is disposed as turned substantially at a right angle.
Figure 10:
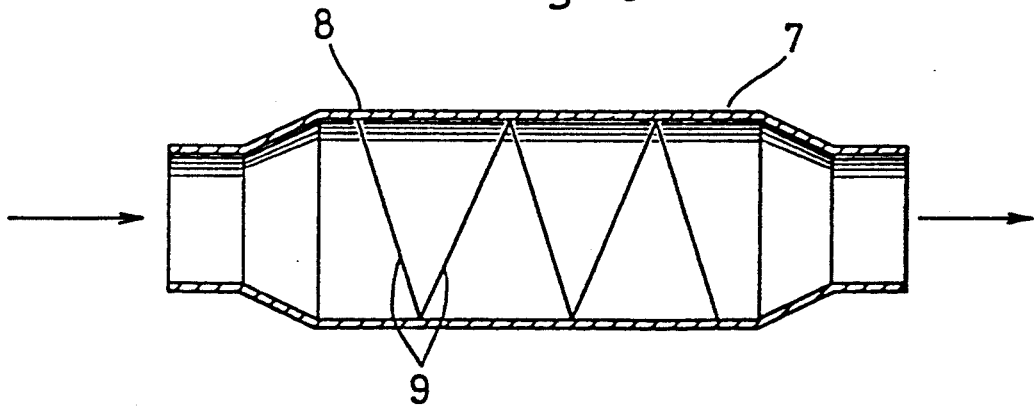
FIG. 10 is a section view of a catalyst device in which the catalyst filters made of the wire net or metallic plate above-mentioned are disposed in a zigzag manner.

In these embodiments of the catalyst device, the shape of the catalyst filter, the exhaust gas flowing angle and the like may be changed in different manners as necessary. For example, as shown in FIG. 9, the particulate removing catalyst filters 9 may be each turned substantially at a right angle and disposed in a casing 8 in parallel with one another at spaced intervals. Alternatively, as shown in FIG. 10, a plurality of particulate removing catalyst filters 9 may be installed in a casing 8 in a zigzag manner. Further, a long particulate removing catalyst filter 9, turned in zigzag manner, may be installed in the casing 8. In these embodiments, the contact areas of the catalyst filters 9 housed in the casing 8 with the exhaust gas, are increased, thereby to improve the exhaust gas treating efficiency.

EXAMPLES

The following description will discuss, in more detail, examples of the present inventions, but the present invention should not be limited to these examples only.

EXAMPLE 1

[Preparation of a carrier in the form of a honeycomb structure]

10 Kgs. of active alumina (A-11 manufactured by Sumitomo Kagaku Kogyo Co., Ltd.), 1 kg of kibushi clay and 500 grs. of methyl cellulose were mixed in a dry condition. The resultant mixture with water added thereto was sufficiently kneaded and extruded from an auger-type extruder on which there was mounted a die having a pitch of 1.33 mm and a wall thickness of 0.3 mm. Thus, a honeycomb was extrudingly formed. The honeycomb was dried with a ventilation-type drier, after which the temperature of the honeycomb was raised at a rate of 5° C. per one hour. The honeycomb was calcined at 500° C. for one hour, thus forming a honeycomb structure having a diameter of 190 mm and a length of 150 mm.

[Preparation of a platina carrying catalyst]

The honeycomb structure above-mentioned was immersed in a 25 g/l chloroplatinic acid aqueous solution and then dried with hot air at 110° C. for one hour with a circulation-type drier. At this time, the temperature of the honeycomb structure was raised to 110° C. within 10 minutes. Then, the honeycomb structure was calcined at 500° C. for one hour, thus forming an alumina-platina carrying honeycomb structure in which 0.1% by weight of platina with respect to the alumina was carried.

As shown in FIG. 1, the open ends at the exhaust gas inlet side and the open ends at the outlet side of the honeycomb structure were alternately closed, thus forming a catalyst filter of the type in which the exhaust gas is forcible passed through the partition walls.

[Preparation of a particulate removing catalyst device]

As shown in FIG. 2, the catalyst carrying honeycomb structure 1 thus obtained, was installed in a cylindrical case 3, thus forming a particulate removing catalyst device.

EXAMPLE 2

A particulate removing catalyst device was obtained in the same manner as Example 1, except that the temperature of the honeycomb structure was raised to 110° C. within 15 minutes in the preparation of the platina carrying catalyst.

EXAMPLE 3

A particulate removing catalyst device was obtained in the same manner as Example 1, except that the temperature of the honeycomb structure was raised to 110° C. within 20 minutes in the preparation of the platina carrying catalyst.

EXAMPLE 4

A particulate removing catalyst device was obtained in the same manner as Example 1, except that the temperature of the honeycomb structure was raised to 110° C. within 25 minutes in the preparation of the platina carrying catalyst.

EXAMPLE 5

A particulate removing catalyst device was obtained in the same manner as Example 1, except that the temperature of the honeycomb structure was raised to 110° C. within 5 minutes in the preparation of the platina carrying catalyst.

EXAMPLE 6

In the honeycomb structure obtained [Preparation of a carrier in the form of a honeycomb structure] in Example 1, the open ends at the exhaust gas inlet side and the open ends at the outlet side were alternately closed. Then, an alumina slurry was poured into the openings at the exhaust gas inlet side. After the excess alumina had been removed, the honeycomb structure was dried and then calcined at 500° C. for one hour, so that alumina was carried on only one side of the partition walls 2. Then, a 25 g/l chloroplatinic acid aqueous solution was poured into the same openings. The honeycomb structure was dried with hot air at 110° C. for one hour with the use of a circulation-type drier. The temperature of the honeycomb structure was raised to 110° C. within 30 minutes. Then, the honeycomb structure was calcined at 500° C. for one hour, thus forming an alumina-platina carrying honeycomb structure in which 0.1% by weight of platina with respect to the alumina was carried.

This honeycomb structure is a catalyst filter in which the catalyst was carried on the surface of only one side of the partition walls, i.e., the exhaust gas inlet side.

Thereafter, a particulate removing catalyst device was prepared in the same manner as Example 1.

COMPARATIVE EXAMPLE 1

A particulate removing catalyst device was obtained in the same manner as Example 1, except that the temperature of the honeycomb structure was raised to 110° C. within 120 minutes in the preparation of a platina carrying catalyst.

EXAMPLE 7

A ceramic fiber sheet having a thickness of 0.3 mm (#2813 manufactured by Nichiasu Co., Ltd.) was cut into pieces each having a width of 150 mm, from which a corrugated plate 4 and a flat plate 5 were made as shown in FIG. 3. These plates 4, 5 were overlapped to form an assembly with the height h of each mountain portion being 1.7 mm and the width w thereof being 3.0 mm. As shown in FIG. 4, this assembly was wound to form a honeycomb structure 6 having a diameter of 190 mm and a length of 150 mm.

This honeycomb structure was immersed in an alumina slurry identical with that in Example 1. After the excess alumina had been removed, the honeycomb structure was dried and then calcined at 500° C. for one hour so that the alumina was deposited thereon. The honeycomb structure was further immersed in a 25 g/l chloroplatinic acid aqueous solution, and then dried with hot air at 110° C. for one hour with the use of a circulation-type drier. The temperature of the honeycomb structure was raised to 110° C. within 30 minutes. Then, the honeycomb structure was calcined at 500° C. for one hour, thus forming an alumina-platina carrying honeycomb structure in which 0.1% by weight of platina with respect to the alumina was carried.

Thereafter, a particulate removing catalyst device was formed in the same manner as Example 1.

Particulate Removing Test

The particulate removing catalyst device thus obtained was installed downstream of the exhaust system of a diesel engine which fed a total of 12 liters of exhaust gas at a rate of 700Nm³/hour to the device. A test of particulate oxidation was conducted on this diesel engine. In the test, the diesel engine was operated at 2000 rpm under a torque of 100 kgs m. Under these operating conditions, the composition of the engine exhaust gas was as follows:

| Component | Concentration |
|---|---|
| NO | 1500 ppm |
| SO₂ | 150 ppm |
| O₂ | 5% |
| H₂O | 10% |

The average concentration of the particulates in the exhaust gas was equal to 1.0 g/Nm³. The reaction temperature was adjusted by externally heating the honeycomb structure.

With the diesel engine operated under the conditions above-mentioned, the particulate removing ratio was obtained. More specifically, there was used a so-called dilution tunnel method in which the exhaust gas from the diesel engine was diluted to generate a situation similar to that at which the exhaust gas was actually discharged into the atmosphere, and the amount of particulates was measured in the situation thus generated. According to this method, there was measured the weight of fine particulates collected on a filter having a thickness of 47 μm mounted on the particulate removing catalyst device at the outlet side. Based on the weight data thus measured, there were obtained the removal ratio of soluble organic components (SOF) and insoluble organic components (IOF), the sulfate generation ratio and the overall particulate removing ratio. As to the SOF and IOF amount, the SOF and IOF were subjected to quantitative analysis by liquid chromatography after the effluent was dissolved in an organic solvent. The amount of hydrochloride was measured by a barium-thorium photometric titration method. Further, portions of the partition walls of the catalyst carrying honeycomb structures obtained in Examples 1 to 7 and Comparative Example 1, were cut out. The amounts of catalyst (Pt) in the portions thus cut, were measured with an X-ray micro-analyzer. The relationships between the distance from the wall surfaces wherein the catalyst was immersed, and the catalyst amounts were obtained. Then, there were set, as the thicknesses of the catalyst layers, the depths of the wall parts in which the ratios of the catalyst amounts to the entire carried catalyst amounts, exceed 95%. In Examples 1 to 5, and Comparative Example 1, each thickness value represents the total sum of the catalyst layer thicknesses of both sides of each partition wall. The test results are shown in Table 1.

TABLE 1

|  | Examples | | | | | | | Comparative Example |
|---|---|---|---|---|---|---|---|---|
|  | 1 | 2 | 3 | 4 | 5 | 6 | 7 | 1 |
| Thickness of Catalyst Layer (μm) | 5 | 12 | 36 | 38 | 56 | 23 | 28 | 300* |
| SOF & IOF Removing Ratio (%) | 62.3 | 73.8 | 76.1 | 74.0 | 75.2 | 78.1 | 75.5 | 80.5 |
| Sulfate Generation Ratio (%) | 0.3 | 0.2 | 0.5 | 3.1 | 16.8 | 0.2 | 0.8 | 389.4 |
| Overall Particulate Removing Ratio (%) | 62.1 | 74.2 | 75.6 | 71.8 | 55.3 | 78.1 | 74.5 | −308.9 |

*The catalyst layer was carried uniformly on the entire partition wall.

As apparent from Table 1, in Examples 1 to 7, the amounts of sulfate produced due to the oxidation of sulfur dioxide are small and, therefore, the SOF and IOF removing ratios represent, as they are, the particulate removing ratios. In Comparative Example 1, the SOF and IOF are decomposed, but the ratio of generating sulfate which newly constitutes particulates, is high. As the result, the particulates are increased in amount.

EXAMPLE 8

[Preparation of a platina carrying wire net]

A wire net of SUS 304 having a diameter of 35 μm and meshes of 44 μm, was cut into a circular disk. After being degreased at 400° C. for 30 minutes, this disk was immersed in a 25 g/l chloroplatinic acid aqueous solution for one minute. This disk was then dried, thus forming a platinum carrying wire net with 0.05 gr. of platinum carried on the wire net surface.

[Preparation of a particulate removing catalyst device]

Twenty five catalyst carrying wire nets each obtained in the manner above-mentioned, were disposed in a cylindrical casing at spaced intervals of 5 mm, as shown in FIG. 5, thus forming a particulate removing catalyst device.

EXAMPLE Example 9

[Preparation of an alumina-platinum carrying wire net]

After 50 grs. of alumina had been spray-coated on a wire net was immersed in a 25 g/l chloroplatinic acid aqueous solution for one minute, and then dried. The wire net was calcined at 500° C. for one hour, and then reduced in a current of a hydrogen-nitrogen mixture at 400° C. for one hour, thus forming an alumina-platinum carrying wire net in which 0.1% by weight of platinum with respect to the alumina was carried.

Thereafter, a particulate removing catalyst device was obtained in the same manner as Example 8.

EXAMPLE 10

[Preparation of a $CuO\text{-}Cr_2O_3\text{-}MnO_2$ carrying wire set]

After 50 grs. of alumina had been spray-coated on a wire net identical with that of Example 8, the wire net was successively immersed in aqueous solutions of copper nitrate, chromium nitrate and manganese nitrate. The wire net was then calcined at 500° C. for one hour, thus forming an alumina-metal oxide carrying wire net in which the total amount of the metal oxide with respect to alumina was 5% by weight, the metal oxide containing $CuO/Cr_2O_3/MnO_2$ at a ratio by weight of 37.5/36/1.8.

Thereafter, a particulate removing catalyst device was obtained in the same manner as Example 8.

EXAMPLE 11

[Preparation of an alumina-palladium carrying wire net]

After 50 grs. of alumina had been spray-coated on a wire net identical with that of Example 8, the wire net was immersed in a 120 g/l palladium-chloride aqueous solution, and then dried. The wire net was then calcined at 500° C. for one hour, and reduced in a current of hydrogen-nitrogen mixture at 400° C. for one hour, thus forming an alumina-palladium carrying wire net in which 1% by weight of palladium with respect to the alumina was carried.

Thereafter, a particulate removing catalyst device was obtained in the same manner as Example 8.

COMPARATIVE EXAMPLE 2

A ceramic form having a diameter of 150 mm and a thickness of 30 mm (Ceramic Foam #20 manufactured by Bridgestone Co., Ltd., which has a hole ratio of 87.5% and is made of cordierite and alumina) was immersed in an alumina slurry. After the excessive alumina had been removed, the wire net was dried. Then, the wire net was calcined at 500° C. for one hour so that 674 grs. of alumina was carried. The wire net was further immersed in a 20 g/l chloroplatinic acid aqueous solution, and then dried. The wire net was calcined at 500° C. for one hour, and then reduced in a current of a hydrogen-nitrogen mixture at 400° C. for one hour, thus forming an alumina-platinum carrying ceramic foam in which 0.1% by weight of platinum with respect to the alumina was carried.

Two catalyst carry ceramic foams each obtained in the manner above-mentioned, were over-lapped, and then disposed in a cylindrical casing similar to the casing shown in FIG. 5, thus forming a particulate removing catalyst device.

COMPARATIVE EXAMPLE 3

A ceramic fiber sheet having a diameter of 150 mm and a length of 300 mm (#2813 manufactured by Nichiasu Co., Ltd.) was immersed in an alumina slurry. After the excessive alumina had been removed, the sheet was dried and then calcined at 500° C. for one hour, so that 1060 grs. of alumina was carried. This sheet was further immersed in a 25 g/l chloroplatinic acid aqueous solution, and then dried. The sheet was calcined at 500° C. for one hour, and then reduced in a current of a hydrogen-nitrogen mixture at 400° C. for one hour, thus forming a honeycomb structure of an alumina-platinum carrying ceramic fiber in which 0.1% by weight of platinum with respect to the alumina was carried. In the honeycomb structure thus obtained, half the number of honeycomb openings at the exhaust gas inlet side was closed while the remaining half the number of honeycomb openings at the exhaust gas outlet side was closed, thus forming a catalyst filter of the type in which the exhaust gas is forcibly passed through the honeycomb walls.

This catalyst filter was disposed in a cylindrical casing similar to that shown in FIG. 5, thus forming a particulate removing catalyst device.

With the use of each of the particulate removing catalyst devices of the Examples and the Comparative Examples, a diesel engine was operated under the conditions above-mentioned. There were measured particulate removing ratios and pressure drop data immediately after, one hour after and 24 hours after start of the operation, respectively. The pressure drop data were obtained by measuring the static pressures between the inlet and outlet sides of the particulate removing catalyst devices. According to the dilution tunnel method, there were measured the weights of fin particulates collected on a 47 μm-filter disposed at the outlet sides of the particulate removing catalyst devices. Based on the weight data thus obtained serving as particulate amounts, the particulate removing ratios were obtained. The results are shown in Table 2.

TABLE 2

|  | Examples | | | | Comparative Example | |
|---|---|---|---|---|---|---|
|  | 8 | 9 | 10 | 11 | 2 | 3 |
| Immediately after the operation | | | | | | |
| Particulate removing ratio (%) | 76.4 | 82.7 | 71.0 | 73.6 | 80.7 | 65.1 |
| Pressure drop (mmH$_2$O) | 40 | 50 | 55 | 50 | 240 | 590 |
| One hour after the operation | | | | | | |
| Particulate removing ratio (%) | 76.4 | 82.8 | 71.3 | 73.6 | 52.4 | 31.6 |
| Pressure drop (mmH$_2$O) | 40 | 50 | 55 | 50 | 3280 | 6130 |
| 24 hours after the operation | | | | | | |
| Particulate removing ratio (%) | 77.0 | 82.5 | 71.0 | 73.8 | —* | —* |
| Pressure drop (mmH$_2$O) | 40 | 50 | 55 | 50 | —* | —* |

*The combustion of fuel was stopped due to increase in pressure drop.

As apparent from Table 2, in Examples 8 to 11, unreacted particulates did not remain and were not accumulated and, therefore, the particulate removing ratios and the pressure loss date did not undergo a substantial change. In Comparative Examples 2, 3, unreacted particulates remained and were accumulated one hour after start of the operation of the engine. Accordingly, the pressure drop was considerably increased, causing the fuel combustion in the engine to be stopped.

What is claimed is:

1. A filter assembly, adapted to remove oxidizable particles from a fluid stream containing such, comprising:

a honeycomb structure comprising a plurality of substantially parallel channel means, at least some of which channel means are defined by common walls which are sufficiently porous to allow the passage of at least some of said fluid therethrough, said channel means having first and second ends, each of which are open at one end and closed at the other end, such that open and closed ended channel means form an inlet side of said honeycomb structure in alternating relationship, and such that open and closed ended channel means form an opposite outlet side of said honeycomb structure in alternating relationship, with the open ended channel means of the inlet side of said honeycomb structure comprising the closed ended channel means of the outlet side of said honeycomb structure; and oxidizing catalyst means disposed at least on the surface of said channel walls to a depth, measured from the surface upon which said catalyst is disposed, of up to about 19% of the thickness of said channel walls, whereby the so defined structure is adapted to allow the passage of a fluid stream carrying said particles through said channel open ends on the inlet side of said honeycomb structure, through said common walls of said channel means, into effective contact with said catalyst on said walls, into adjacent channel means, and out the open ends of said adjacent channel means on the outlet side of said honeycomb structure.

2. A particulate removing catalyst filter according to claim 1, wherein the oxidizing catalyst is carried on both sides of said common walls.

* * * * *